United States Patent
Cordell et al.

(10) Patent No.: US 6,307,660 B1
(45) Date of Patent: Oct. 23, 2001

(54) OPTICAL RECEIVER PARTICULARLY USEFUL FOR A MULTI-WAVELENGTH RECEIVER ARRAY

(75) Inventors: Robert Roger Cordell, Middletown; Paul Grabbe, Tinton Falls; James John Ringo, Brick, all of NJ (US)

(73) Assignee: Tellium, Inc., Oceanport, NJ (US)

( * ) Notice: Subject to any disclaimer, the term of this patent is extended or adjusted under 35 U.S.C. 154(b) by 0 days.

(21) Appl. No.: 09/010,412

(22) Filed: Jan. 21, 1998

Related U.S. Application Data

(60) Provisional application No. 60/036,775, filed on Jan. 28, 1997.

(51) Int. Cl.[7] .............................. H04B 10/06; H04B 1/38; H04B 1/04
(52) U.S. Cl. ........................ 359/189; 359/194; 359/195; 455/73; 455/130
(58) Field of Search ................................... 359/189, 194, 359/195; 455/73, 130, 333, 334

(56) References Cited

U.S. PATENT DOCUMENTS

| | | | |
|---|---|---|---|
| 4,241,455 | * 12/1980 | Eibner | 455/600 |
| 4,257,125 | * 3/1981 | Theall, Jr. | 455/608 |
| 4,713,841 | * 12/1987 | Porter et al. | 455/608 |
| 5,257,285 | * 10/1993 | Thorp | 375/11 |
| 5,455,703 | * 10/1995 | Duncan et al. | 359/152 |
| 5,636,048 | * 6/1997 | Kogure et al. | 359/189 |

* cited by examiner

Primary Examiner—Leslie Pascal
Assistant Examiner—M. R. Sedighian
(74) Attorney, Agent, or Firm—Morgan, Lewis & Bockius LLP

(57) ABSTRACT

A multi-wavelength optical receiver including multiple photodetectors receiving different ones of a multi-wavelength signal. For each wavelength-dedicated photodetector, a separate electronic receiver circuitry is provided including a current-to-voltage converting input transistor and an emitter-follower output transistor arranged as an operational amplifier with a feedback resistor. The circuit is improved by a cascode connection to the input transistor, by a reference to an analog ground rather than to a power supply line in both the photodiode and the cascode transistor, by the addition of capacitive shunts and a clamping transistor parallel to the feedback resistor in the feedback loop from the output transistor to the input transistor, by including positive and negative power supplies for the input and the output stages, by including multiple emitter followers in the output, by use of a differential second stage referenced to the analog ground, and by use of an output matching network that makes use of parasitic packaging inductances. Thereby, noise is reduce and inter-channel interference is minimized.

23 Claims, 4 Drawing Sheets

OPTICAL RECEIVER PARTICULARLY USEFUL FOR A MULTI-WAVELENGTH RECEIVER ARRAY

RELATED APPLICATION

This application claims benefit of U.S. Provisional Application No. 60/036,775, filed Jan. 28, 1997.

FIELD OF THE INVENTION

The invention relates generally to semiconductor amplifier circuits. In particular, the invention relates to a receiver circuit coupled to the output of a semiconductor photodiode.

BACKGROUND ART

Modem telecommunications networks are increasingly relying upon optical fibers and wavelength-division multiplexing (WDM). Silica optical fibers can transmit optical signals in optical bands near 1300 nm and 1550 nm over long distances with low loss and low chromatic dispersion. The digital transmission rate is primarily limited by the electronics at the transmitter and receiver ends, currently about 10 gigabits per second (Gb/s). The net data rate can be multiplied by wavelength division multiplexing in which the fiber carries multiple optical carrier wavelengths in one or the other of the previously mentioned bands. At the transmitter end, multiple laser diodes emitting light at respective ones of the multiple WDM wavelengths of number M have their outputs modulated by separate electronic data signals. The multiple optical signals are optically multiplexed together and then coupled onto the optical fiber. At the receiver end, the multiple WDM signals of number Mare optically demultiplexed to their constituent wavelengths. The individual optical signals are detected by a photodetector, typically a photodiode and most usually a PIN diode. A PIN diode has a large intrinsic region between its p- and n-type layers. The photodetector output is then conditioned and amplified for further processing as an electronic signal. The combination of photodetector and associated electronic circuitry is often referred to as an optical receiver. For a WDM receiver, the receiver function needs to be replicated for all the WDM wavelengths in what is referred to as a receiver array. WDM systems are being fielded with four wavelengths, that is, M=4. Sixteen wavelengths are being planned. The number M is expected to increase to up to about forty.

Great strides have been made in integrating the optical demultiplexer and photodetectors on a single integrated circuit chip, usually formed in compound semiconductors compatible with InP, for example, InGaAs. The receiver circuitry can also be integrated on the same chip, thus resulting in a moderately inexpensive, highly integrated receiver system.

However, the electronic circuitry required in a receiver array must satisfy several difficult requirements. To achieve long propagation spans, the optical signal level at the photodetector may be very small. The detection process may involve only a few photons. Thus, the receiver must accept low electronic input signals. The receiver circuitry must introduce a minimum of its own noise since low-level photodetector signals are already noisy. The receivers should operate at high data rates, a minimum of 2 Gb/s and preferably at least 10 Gb/s. For multiple receivers to be integrated onto a chip and using the same power supply lines, the cross talk between receivers, corresponding to different data channels, must be small.

Hence, in order to meet system requirements, the receiver array circuitry requires an advanced design.

SUMMARY OF THE INVENTION

The invention may be summarized as an optical receiver, especially appropriate for integration into a receiver array for use in a multi-wavelength communication system. A basic configuration includes a biased photodiode feeding its photocurrent into a circuit which can be characterized as a transimpedance amplifier designed as an operational amplifier including a feedback loop incorporating a feedback resistance. The operational amplifier includes a first bipolar input transistor into the base of which the photocurrent is input. The collector is connected to the feedback loop including a second bipolar output transistor, the biased base of which is connected to the collector of the input transistor. The emitter of the output transistor drives the voltage output and is also connected to the feedback loop through the feedback resistor to the base of the input transistor.

In one aspect of the invention, a cascode transistor has its principal current terminals interposed between the collector of the input transistor and the base of the output transistor.

In another aspect of the invention, the biasing of the base of the cascode transistor is referenced to a local ground, preferably through a diode string, thus providing isolation from cross talk from the first power supply line.

In yet another aspect of the invention, the biasing of the photodiode is referenced to a local ground, preferably through a diode string. Even more preferably, the diode strings for the cascode and photodiode biasing is accomplished with separate diode strings, allowing separate tuning of the two biasing schemes to optimize high-frequency performance.

In a progressive aspect of the invention, the output transistor is configured as an emitter follower and one or more additional emitter followers may be coupled on the output path.

In one more aspect of the invention, a second power supply line, preferably of opposed polarity from that of the first power supply line biases one or more output transistors.

In yet one more aspect of the invention, non-resistive elements are put in parallel to the feedback resistor in the feedback path. A shunt capacitor improves high-frequency stability. A further resistor placed in series with the shunt capacitor provides a finite feedback impedance even at very high frequencies. The shunt capacitance may be coupled to an earlier emitter follower than is the feedback transistor to provide a better combination of bandwidth and stability. A clamp diode or transistor in parallel with the feedback resistor prevents the output from going negative in the presence of a very large detected optical signal.

DETAILED DESCRIPTION OF THE PREFERRED EMBODIMENTS

Figure 1:
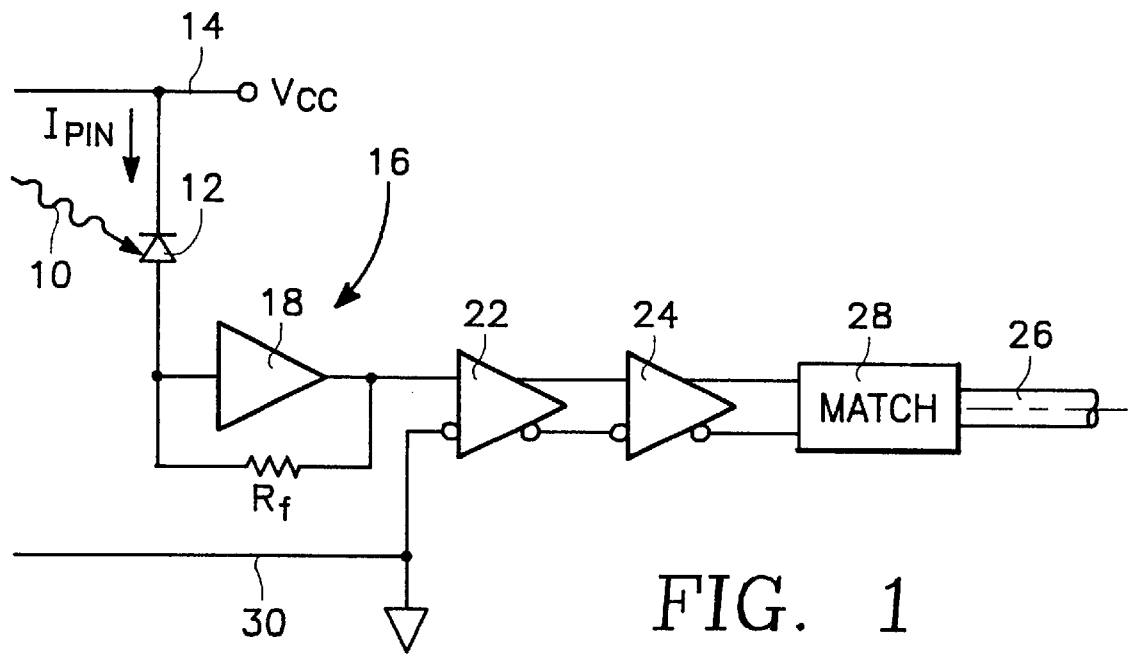
FIG. 1 is a general schematic diagram of an optical receiver achieved by the invention.

An optical receiver can be broken down into several distinct amplifier sections. As illustrated in the general schematic diagram of FIG. 1, an optical signal 10, corresponding to one of the wavelength-division multiplexed (WDM) wavelengths, is incident upon a PIN photodiode 12 reversed biased by a DC source $V_{cc}$ connected to a common power bus 14, where $V_{cc}$ is preferably +5VDC. The reversed biased photodiode or PIN diode 12, when irradiated by a pulse of light 10, produces a photocurrent $I_{PIN}$ that is input to a transimpedance amplifier 16, represented by an operational amplifier 18 having a feedback resistor $R_f$ and whose input presents a voltage ground to the PIN diode 12. The transimpedance amplifier 16 acts as a low-noise preamplifier converting the current input $I_{PIN}$ to a voltage output and providing some gain, typically a transimpedance of about 1500 Ω.

The output of the transimpedance amplifier 16 is input to a middle-stage amplifier 22 having two principal functions. It converts a single ended input to a differential output, a crucial feature in improving immunity to power supply noise and crosstalk from other channels. It also provides further gain, typically about a voltage gain of about five so that the combination of the transimpedance amplifier 16 and the middle-stage amplifier 22 provide a net transimpedance of 7500 Ω.

The differential outputs of the middle-stage amplifier 22 are further amplified by a differential output amplifier 24 which provides strong signals for further electronic processing or transmitting along a transmission line 26 after being properly matched in a preferably passive matching circuit 28. At the very high bit rates anticipated here, matched microwave transmission is required. Assuming that the transmission line 26 has a characteristic impedance of 50 Ω for each differential side and that both the source and terminating ends are loaded with this value of impedance, the output amplifier 24 must drive 25 Ω.

It is of course appreciated that the circuitry of FIG. 1 is replicated for each of the M WDM wavelengths with the exception of a single DC power supply 14 and a common ground bus 30 being used for all M receivers.

Figure 2:
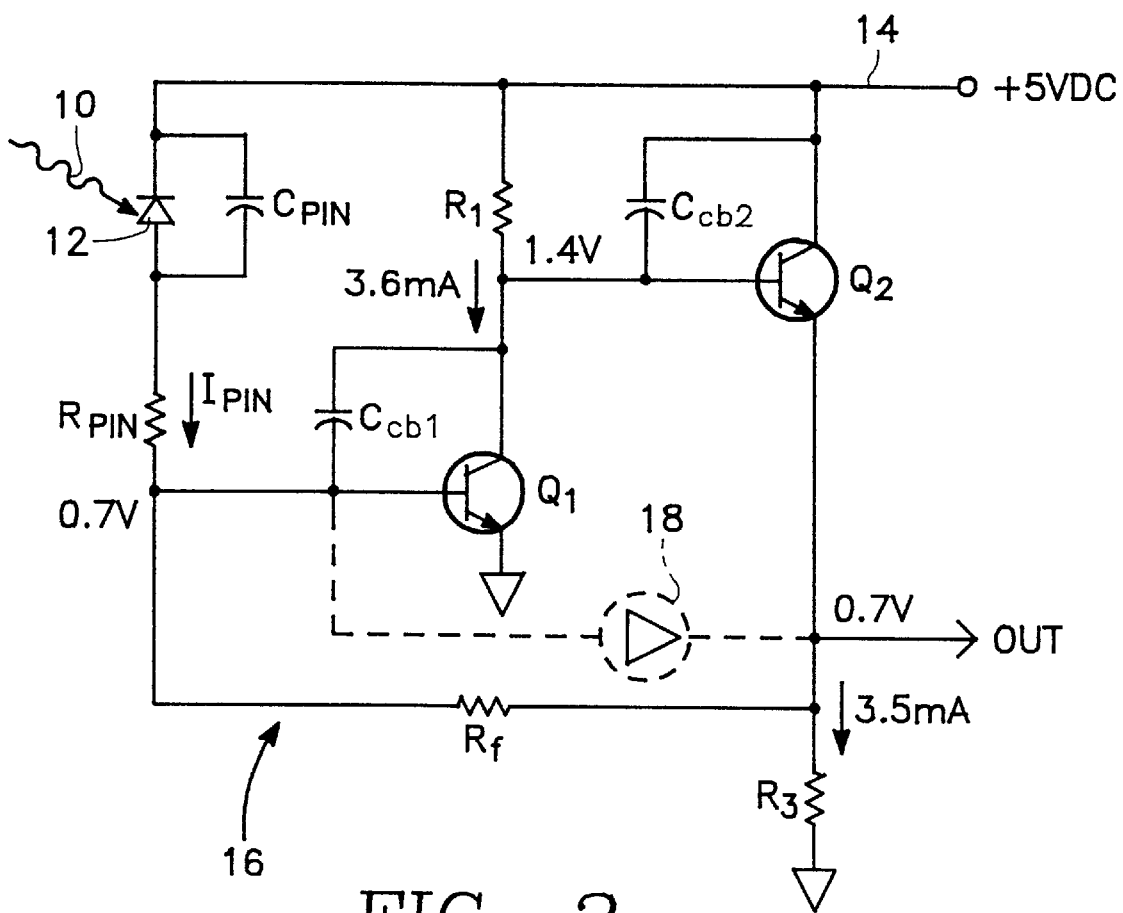
FIG. 2 is a schematic diagram of a conventional preamplifier section of the optical receiver of FIG. 1.

We have developed a design to implement an optoelectronic integrated circuit (OEIC) which is capable of working at 2.5 Gb/s and which can be further improved for operation at 10 Gb/s. Designing such a high-performance OEIC is matter of knowing what is wrong with a simple one. The crucial design is involved in the preamplifing transimpedance amplifier 16 although the other stages need to be carefully considered as well. We start with a simple two-transistor model of the transimpedance amplifier 16, as illustrated in FIG. 2, explain its limitations, and then proceed to improve upon the simple design. The circuitry of FIG. 2 explicitly shows a number of parasitic capacitances which are important for high-frequency operation.

The PIN diode 12 includes a substantial capacitance $C_{PIN}$ in the amount of perhaps 250 fF and some serial resistance $R_{PIN}$. The parasitic resistance $R_{PIN}$ is about 5 Ω, but sometimes additional serial resistance is added to increase stability.

The two principal transistors are an input transistor $Q_1$ and an output transistor $Q_2$, each being NPN transistors and each having a corresponding parasitic collector-base capacitance $C_{cb1}$, $C_{cb2}$. It is possible to instead use PNP transistors in this design with appropriate well known modifications in the circuitry. Typical values of these capacitances and of other components in the circuit are listed in TABLE 1.

TABLE 1

| | |
|---|---|
| $R_1$ | 1000 Ω |
| $R_f$ | 1000 Ω |
| $R_3$ | 200 Ω |
| $C_{cb1}$ | 50 fF |
| $C_{cb2}$ | 50 fF |
| $C_{PIN}$ | 250 fF |
| $R_{PIN}$ | 5 Ω |

The virtual operational amplifier 18 is implemented between the base of the input transistor Q1 and the emitter of the output transistor $Q_2$, with the feedback resistor $R_f$ determining the available transimpedance. If the transistors $Q_1$, $Q_2$ have very high current gain and very high transconductance, that is, the beta of the input transistor is high, the transimpedance at low frequencies would be about 1000 Ω, the same value as the feedback resistor $R_f$, and the AC potential at the base of the input transistor $Q_1$ would be zero if the transconductance of the input transistor $Q_1$ is infinite.

Biasing and DC Gain

Biasing in this circuit is simple. About 0.7V of voltage resulting from the photocurrent pulse $I_{PIN}$ is required at the base of the input transistor $Q_1$ to turn it on. The design is such that the DC voltage is biased to just below the turn-on voltage and the photocurrent pulse raises the voltage between the base and emitter to above the turn-on voltage. If the input transistor $Q_1$ has even reasonable beta, there is very little DC voltage drop across the feedback resistor $R_f$. Therefore, the emitter of the output transistor $Q_2$ is also at 0.7VDC. Then, the base of the output transistor $Q_2$ must be 0.7VDC higher than its emitter, make the base voltage of 1.4VDC, the same biasing voltage as at the collector of the input transistor $Q_1$. Thus the input transistor $Q_1$ is reversed biased from base to collector at −0.7VDC. This sets the operating point of the input transistor $Q_1$ at 3.6 mA since the collector current is dropped from the power supply bus 14 at +5VDC across an input load resistor $R_1$, which is given a value of 1000 Ω. This assumes that the output transistor $Q_2$ has a high beta and thus negligible base current.

The output transistor $Q_2$ is operated as an emitter follower. In an emitter follower configuration, the input and output are in phase and the output voltage is slightly less than the applied signal. The circuit of FIG. 2 shows the output transistor $Q_2$ configured with a common collector, but other configurations such as a common base are well known. Usually however the output is taken from the emitter terminal while the signal is applied to the base with a power supply directly biasing the collector and indirectly biasing the base through a biasing resistor. The output load resistor $R_3$ sets the operating point of the output transistor $Q_2$ at 3.5 mA as the 0.7VDC emitter voltage is dropped over the output load resistor $R_3$ to ground.

The forward DC gain of the operational amplifier 18 (from the base of the input transistor $Q_1$ to the emitter of the output transistor $Q_2$) is approximately the ratio of the net load resistance $R_1$ at the collector of the input transistor $Q_1$ to the dynamic emitter resistance $r_E$ of the input transistor $Q_1$, which is the inverse of the transistor transconductance. The dynamic emitter resistance $r_E$ of a transistor is approximately its DC emitter resistance $R_E$ plus a dynamic base-emitter resistance $r_{BE}$ given by $$r_{BE} = \frac{25\Omega}{I_c(\text{mA})}, \quad (1)$$

where $I_c$ is the current into the collector in milliamps. The quantity of Equation (1) is also referred to as the inverse of the AC gain $g_m$ and is applicable to diodes in some situations. For the input transistor $Q_1$ with $R_E=5\ \Omega$ and $I_c=3.6$ mA, $r_E=12.2\ \Omega$, the effective load resistance is the value of the input load resistance $R_1$ in parallel with the load resistance seen looking into the base of the output transistor $Q_2$. The latter load resistance is roughly the feedback resistance $R_f$ in parallel with the output load resistance $R_3$, that is, about 167 $\Omega$. For a beta of 50, the impedance seen at the base of the output transistor $Q_2$ is thus 8350 $\Omega$, and the net load resistance at the collector of the input transistor $Q_1$ is 893 $\Omega$. The DC voltage gain is thus on the order of 893/12.2=73 although this value will be reduced a bit by other effects.

AC Gain and Bandwidth

To first order, the AC voltage gain is limited by the collector-base capacitances $C_{cb1}$, $C_{cb2}$ and any other stray capacitance at the critical collector node of the input transistor $Q_1$. As an initial estimate, the open-loop gain will be down 3dB at the corner frequency of $R_1 \cdot (C_{cb1}+C_{cb2})$ and declines 6 dB per octave thereafter. For a collector load resistance $R_1$ of 1000 $\Omega$ and a total of the collector-base capacitances of 100 fF, the open-loop bandwidth would be about 1.6 GHz. However, this derivation of the bandwidth of the transimpedance amplifier is not complete.

There are two other major influences in determining the transimpedance closed-loop bandwidth, (1) the effect of the collector-base capacitance $C_{cb1}$ of the input transistor $Q_1$, which is in the feedback loop, and (2) the effect of the PIN shunt capacitance $C_{PIN}$.

With the model of the operational amplifier 18 for the two transistors $Q_1$, $Q_2$ it is seen that the input collector-base capacitance $C_{cb1}$ may as well be in parallel with the feedback resistance $R_f$ since the signal voltage at the collector of the input transistor $Q_1$ is essentially the same as that at the emitter of the output transistor $Q_2$ since the latter is an emitter follower with nearly unity gain. In this model, the 3 dB point of the transimpedance amplifier would be the corner frequency of $R_f \cdot C_{cb1}$, which for the above values would produce a corner frequency of 3.2 GHz. However, this value is optimistically too high since the open-loop gain begins to fall off first.

The effect of the PIN shunt capacitance $C_{PIN}$ depends on the effective resistance of the circuit across it. If the ideal model of the operational amplifier 18 were valid, the op-amp input at the base of the input transistor $Q_1$ would be a virtual ground, and the resistance across the PIN shunt capacitance $C_{PIN}$ would essentially be the series resistance $R_{PIN}$ of the PIN diode 12 itself. This model yields the maximum intrinsic PIN bandwidth. However, this model is overly optimistic, even taking into account the normal 50 $\Omega$ load. The fact is that the impedance seen looking into the amplifier rises with frequency as the open-loop voltage gain decreases with frequency so that the impedance is somewhat inductive and is thus much higher in the frequency range of interest.

Loop Stability and Peaking

At the high frequencies being contemplated here, the stability of the feedback loop and the flatness of gain become critical issues. The PIN shunt capacitance $C_{PIN}$ is of particular importance. The amplification pole created at the collector of the input transistor $Q_1$ by the input load resistor $R_1$ and the capacitance at that critical node accounts for one pole in the feedback loop. Another pole in the loop occurs at the corner frequency of the feedback resistance and the PIN shunt capacitance $R_f \cdot C_{PIN}$ as well as some additional stray capacitances. The second pole can destabilize the loop or cause peaking in the response. The second pole often occurs at a lower frequency than the first and may thus dominate the closed-loop bandwidth. With the above values, the second pole occurs at 0.64 GHz in contrast to the first pole occurring at 1.6 GHz.

Additionally, there is the Miller effect arising from the collector-base capacitance $C_{cb1}$ of the input transistor $Q_1$, but this has a stabilizing influence since it acts as a small shunt capacitance across the feedback resistance R and thus puts a zero in the feedback loop. The Miller effect arises in inverting amplifiers in which the input capacitance is sensitive to the voltage gain of the amplifier and the capacitance between the input and output terminals of the amplifier. The Miller effect acts to increase the effective input capacitance. To some extent, the feedback shunt capacitor, whether it be the collector-base capacitance $C_{cb1}$ of the input transistor $Q_1$ or a capacitance deliberately shunted across the feedback resistance $R_f$ forms a capacitive voltage divider with the effective shunt capacitance $C_{cb1}$ of the PIN diode 12. To the extent that this model is true, the high-frequency attenuation in the feedback network flattens out at very high frequencies, causing the overall loop to approach more of a single-pole characteristic, the dominant pole being associated with the collector of the input transistor $Q_1$. However, finite source impedance at the input to the feedback network can significantly detract from this effect. In short, it is difficult for the circuit to drive the nearly pure 250 fF of PIN capacitance $C_{PIN}$ at high frequencies. The PIN series resistance $R_{PIN}$ of 5 $\Omega$ is fairly negligible at higher frequencies.

If additional stability is required, additional resistance may be placed in series with the PIN resistance $R_{PIN}$, at the price of increased noise and slightly reduced bandwidth.

Noise

The noise of the transimpedance amplifier is very important because it is perhaps the most significant factor in establishing the input sensitivity. Noise in the input section is usually specified in picoamps per root hertz, that is, the amount of current noise that would need to be applied to the input, as if from the PIN diode 12, to result in the observed amount of voltage noise at the output.

There are several noise contributions, and their behavior is different, both in different designs and in different frequency ranges. Typically, in OEIC transimpedance amplifiers, the input-referred noise spectrum is flat with frequency at low frequencies but at some higher frequency begins to rise with frequency, often at least initially at 6 dB per octave.

Base shot noise, which is the noise component of the base current of the input transistor $Q_1$, often dominates at low frequencies and tends to be flat with frequency. It is proportional to the input base current required to bias the input transistor $Q_1$ at its operating point. It is thus inversely proportional to the beta of the input transistor $Q_1$ and directly proportional to its collector current. Biasing the input transistor $Q_1$ at a low current can reduce the input noise, but bandwidth may suffer and other noise components may increase.

The resistor noise of the feedback resistor $R_f$ also tends to be flat with frequency. Since thermal noise voltage of a resistor is constant with resistance but the noise current fed back to the operational amplifier 18 is crucial, current noise arising from the feedback resistor $R_f$ increases as the $R_f$ is made smaller. To minimize noise, the value of the feedback resistance $R_f$ should be increased. However, this design generally conflicts with increasing the bandwidth.

The input transistor $Q_1$ itself has input voltage noise, largely a function of the total dynamic emitter resistance $r_E$. Because the amplifier's input node is capacitively shunted, primarily by the PIN capacitance $C_{PIN}$, the frequency-flat voltage noise is converted to an input-referred current noise that increases with frequency. The base resistance $R_B$ of the input transistor $Q_1$ can also contribute to the input-referred voltage noise. Minimizing the base resistance noise, which often dominates at high frequencies, argues for using a large input transistor biased at a high current. The large transistor has lower emitter and base resistance $R_E$, $R_B$, and operating it at a higher collect current increases the transconductance and reduces the dynamic emitter resistance $r_E$, as defined before. However, there are obvious tradeoffs. The larger transistor size will increase the base shot noise and will increase the transistor capacitance parasitics $C_{cb1}$, and $C_{je1}$, the last quantity being the emitter junction capacitance of the input transistor $Q_1$. Any increase in capacitance may compromise bandwidth.

Crosstalk

The cathode end of the PIN diode 10, which should act as an AC ground, is connected to the power supply through the power supply line 14 to a DC power supply, not to a true quiet analog ground. Any noise on the positive power supply line 14 arising from the receiver for another wavelength will pass through the PIN shunt capacitance $C_{PIN}$ directly to the base of the input capacitor $Q_1$ just as if it were PIN photocurrent for the receiver of this wavelength. Furthermore and of particular concern, the noise contribution increases with frequency because the impedance of the PIN shunt capacitance $C_{PIN}$ decreases with frequency. The impedance of the PIN shunt capacitance $C_{PIN}$ needs to be compared with the feedback resistance $R_f$ in determining the frequency of unity gain for noise from the positive power supply line 14. For the above circuit parameters, this frequency is 636 MHz. Above this frequency, the situation worsens.

Figure 3:
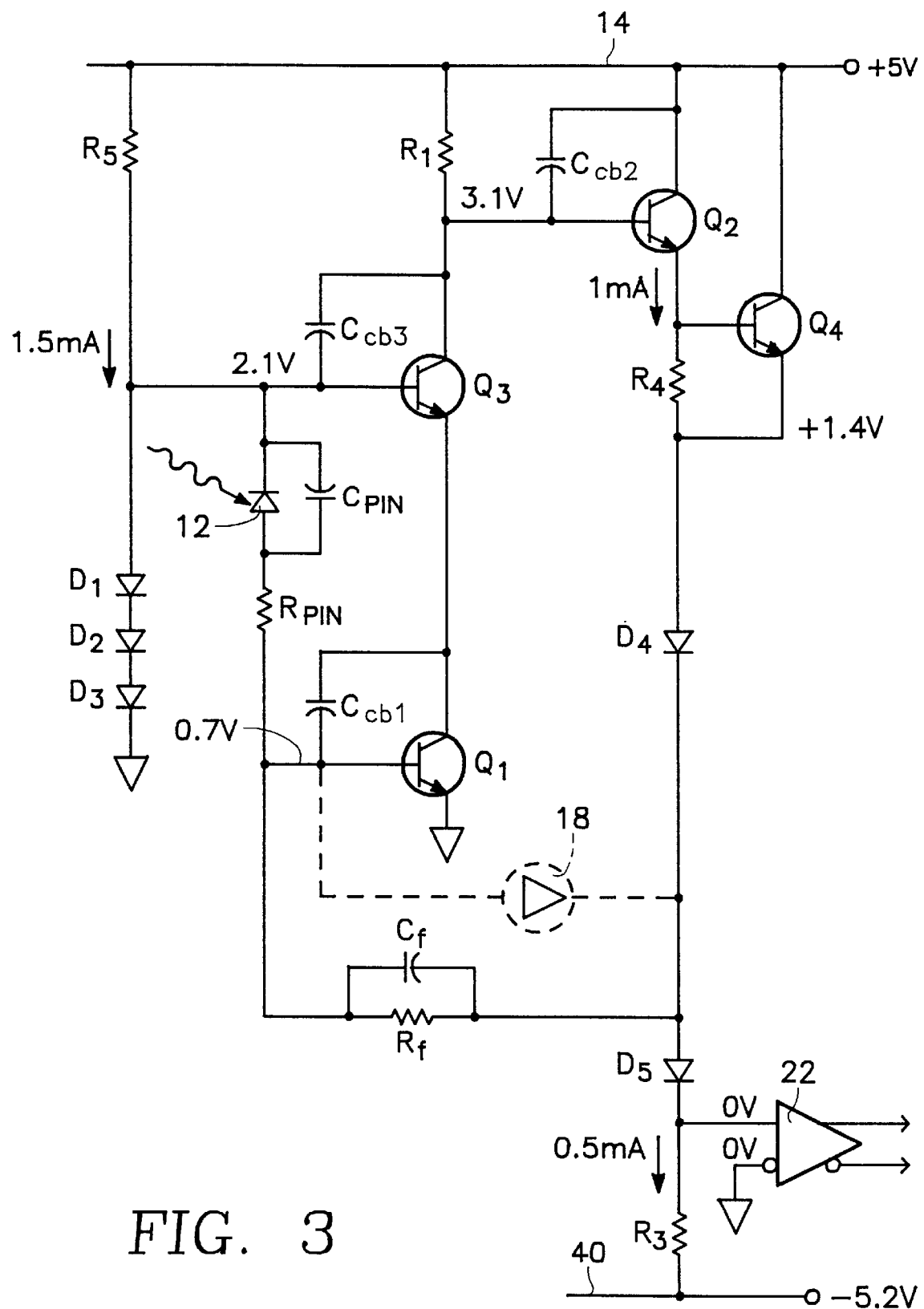
FIG. 3 is a schematic diagram of an improved version of the preamplifier section of FIG. 2.

Based upon a number of observations presented above, the transimpedance amplifier of FIG. 2 can be improved as shown by the circuitry of FIG. 3. The parameters of circuit elements are given in TABLE 2 for any new elements or those having values changed from TABLE 1.

TABLE 2

| | |
|---|---|
| $R_3$ | 1000 Ω |
| $R_4$ | 1500 Ω |
| $R_5$ | 2000 Ω |
| $C_f$ | 25 fF |

The input transistor $Q_1$ is cascoded by a cascode transistor $Q_3$. Its collector and emitter are placed between the input collector load resistor $R_1$ and the collector of the input transistor $Q_1$. A cascode connection places two transistors in a series path between their principal current ports, that is, their emitters and collectors for bipolar transistors. In the most practical cascode connection, the emitter of one transistor is directly connected without an intervening current source or sink to the collector of the other. This arrangement provides a high input impedance with low voltage gain to ensure that the input Miller capacitance is minimized with the cascode transistor providing good high-frequency operation. A fixed bias voltage of 2.1V to the base of the cascode transistor $Q_3$ is established at the midpoint in the serial connection of a load resistor $R_5$ connected to the positive power supply line 14 and three forwardly biased diodes $D_1$, $D_2$, $D_3$ connected to ground. Each of the diodes establishes a $V_{be}$ of about 0.7V across the diode. A reversed biased Zener diode could be used, but their availability with the correct Zener voltage in the InGaAs material system preferred for the receiver array is uncertain. Also, forwardly biased diodes can be made with the same design as the transistors of the circuit, and any change in processing conditions similarly affect all of them. The fixed bias voltage of the diode string is referenced to ground rather than to the noisier positive power supply line 14 and acts as an AC ground. This is the same ground as applied to the emitter of the input transistor $Q_1$. It is advisable to establish a local quiet ground in the transimpedance amplifier isolated from other grounds in the circuitry. The fixed bias is connected to the base of the cascode transistor $Q_3$. The cascode configuration eliminates the Miller-effect feedback through the collector-base capacitance $C_{cb1}$ of the input transistor $Q_1$, thus providing more flexibility in designing the transimpedance bandwidth and permits higher bandwidths or alternatively higher values of the feedback transistor $R_f$ for a given bandwidth.

Cross talk is significantly reduced by biasing the cathode of the PIN diode 12 with the 2.1V ground-referred voltage of the diode string $D_1$, $D_2$, $D_3$. With the DC base voltage of the input transistor $Q_1$ being 0.7V, the PIN diode is reversed biased at 1.4V, more than enough to fully deplete it. This ground-referred biasing prevents power supply noise and crosstalk on the positive power supply line 14 from passing through the PIN shunt capacitance $C_{PIN}$ into the input of the amplifier circuit.

The use of the cascode requires some changes to the biasing to preserve adequate headroom at the collector of the cascode transistor $Q_3$. The potential at the collector of the input transistor $Q_1$ is increased from 1.4V to 3.1V. The output transistor $Q_2$ was operated in FIG. 2 as an emitter follower. Here, another emitter follower including another output transistor $Q_4$ and resistor $R_4$ across its base and emitter is connected to the emitter of the first output transistor $Q_2$. The second emitter follower $Q_4$ serves to increase the collector potential at the input transistor $Q_1$ by another $V_{be}$, that is, 0.7V while adding current gain to lighten the load on the critical node, which is now the collector of the cascode transistor $Q_3$. Yet another diode $D_4$ inserted between the output of the second emitter follower $Q_4$ and the feedback resistor $R_f$ provides a second $V_{be}$ of increased biasing voltage in the input stage. The value of the resistor $R_4$ is chosen to bias the first output transistor $Q_2$ at an operating point of 1 mA.

These changes cause the voltage drop across the input resistor $R_1$ to be reduced with the result that the quiescent current of the input transistor $Q_1$ is reduced to 2.2 mA. Therefore, the transconductance of the input transistor is reduced to a value corresponding to an increased dynamic emitter resistance $r_E$ of 1 6.8 Ω, as previously defined, and thus the low frequency gain is reduced, but to an acceptable level.

The use of a single +5VDC power supply in FIG. 2 means that the output load resistor $R_3$, across which a single $V_{be}$ is impressed, needs to be fairly small at 200 Ω to establish the desired current through the output of the emitter follower $Q_2$. Such a low output load tends to substantially load the amplifier. In the transimpedance amplifier of FIG. 3, a second, negative power supply applies −5.2VDC to a negative power supply line 40. This allows a large output load $R_3$ of 1000 Ω to pull the output node down to the −5.2V power supply with the negatively biased output load $R_3$ operating as a pull-down current source. Other, more complex current sources could be substituted. The negative power source also prevents a very strong light pulse from pulling the 0.7V output of FIG. 2 so far in the negative direction as to totally lose the output-stage pull-down current.

To farther reduce cross talk, the output of the transimpedance amplifier is extracted through the differential amplifier 22 with one input referenced to the local quiet ground. A diode $D_5$ level shifts the output of the transimpedance amplifier downwardly by one $V_{be}$ to allow direct DC coupling between the transimpedance amplifier and the differential amplifier 22.

The critical node of the improved amplifier is now the collector of the cascode transistor $Q_3$. Its frequency limit is about the same, as determined by $R_1 \cdot (C_{cb2}+C_{cb3})$. Advantageously, it is referred to an AC ground through the diode string $D_1$, $D_2$, $D_3$, rather than to the amplifier input node as in FIG. 2. By the same token, the collector-base capacitance of the input transistor $Q_1$ is connected to an AC ground through the emitter of the cascode transistor $Q_3$ and the diode string $D_1$, $D_2$, $D_3$ so as to eliminate the Miller effect and to help in increasing bandwidth, major advantages of the cascode design. However, the absence of the Miller effect will somewhat destabilize the feedback loop of the amplifier. To counteract this instability, a capacitance $C_f$ is put in shunt with the feedback resistor $R_f$. Its effect is somewhat like that of the collector-base capacitance of the input transistor $Q_1$ in the design of FIG. 2, but now its value can be controlled, and the feedback can be taken from the output of the emitter follower $Q_4$. The feedback capacitor $C_f$ tends to provide a stabilizing zero in the feedback loop. It can operate as a capacitance voltage divider in opposition to the PIN shunt capacitance $C_{PIN}$, and at higher frequencies it can introduce a true zero against the PIN resistance $R_{PIN}$.

There are two points with the diode string that require further discussion.

The diode string $D_1$, $D_2$, $D_3$ does not provide a true zero AC impedance. With 1.5 mA of current flowing through it, it has an impedance of about 52 Ω, according to Equation (1). Thus, the total impedance to ground from the anode of the PIN diode 12 is 57 Ω, not 5 Ω. The added resistance is equivalent to that sometimes intentionally placed in series with the PIN resistance $R_{PIN}$ to improve stability. The feedback capacitance $C_f$ now works against 57 Ω. If the feedback capacitance $C_f$ is 25 fF, the circuit has a pole-zero pair. The zero is determined by $C_f \cdot R_f$, that is, 6.4 GHz, while the pole is determined using $C_f$ and 57 Ω, that is, 112 GHz. Thus, the dynamic resistance of the diode string has a major influence on stability, and stability can be adjusted somewhat by adjusting the bias current through the string.

In the design of FIG. 3, the collector-base capacitance $C_{cb3}$ of the cascode transistor $Q_3$ couples feedback from the collector of the cascode transistor $Q_3$ into the diode string $D_1$, $D_2$, $D_3$. As has been described above, the diode string has non-zero AC impedance so that the signal coupled by the parasitic capacitance $C_{cb3}$ of the cascode diode $Q_3$ may be conveyed through the PIN capacitance $C_{PIN}$ into the base of the input transistor $Q_1$. The diode string thus provides something of a bypass path around the isolating influence of the cascode configuration. The effect, which is somewhat similar to the Miller effect, is smaller than before, but it does exist and is generally not desirable.

Figure 4:
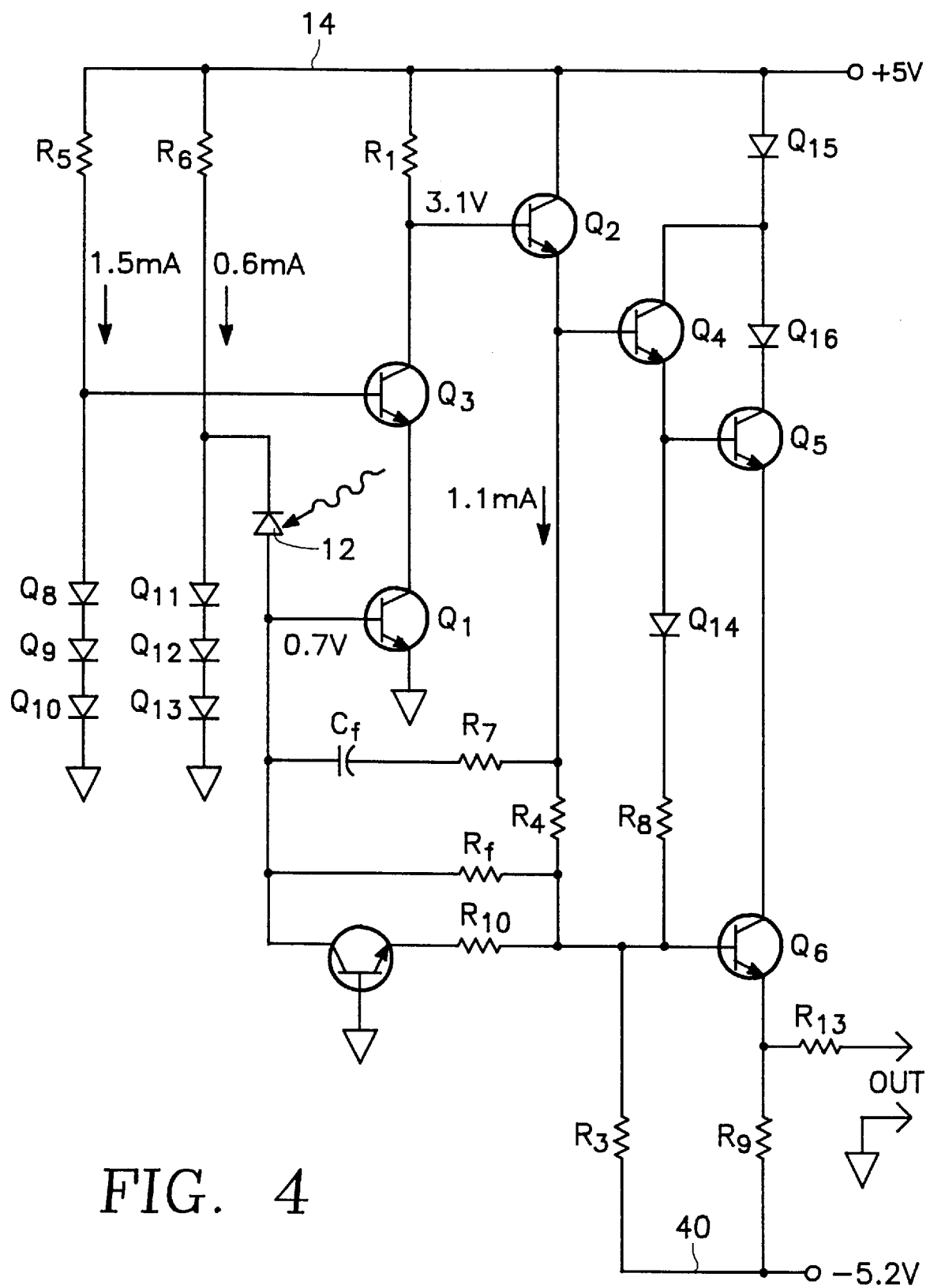
FIG. 4 is a schematic diagram of a yet further improved version of the preamplifier section of FIG. 3.

Based upon the above two designs and observations on them, the transimpedance amplifier of FIG. 3 can be further improved by the design shown by the schematic of FIG. 4. This schematic does not show any parasitics. The value of preferred values of all elements is presented in TABLE 3.

TABLE 3

| | |
|---|---|
| $R_1$ | 1500 Ω |
| $R_f$ | 1500 Ω |
| $R_3$ | 1500 Ω |
| $R_4$ | 1500 Ω |

TABLE 3-continued

| | |
|---|---|
| $R_5$ | 2000 Ω |
| $R_6$ | 5000 Ω |
| $R_7$ | 300 Ω |
| $R_8$ | 100 Ω |
| $R_9$ | 4000 Ω |
| $R_{10}$ | 300 Ω |
| $R_{13}$ | 50 Ω |
| $C_f$ | 25 fF |

A significant circuit change is that separate diode biasing strings are used for biasing the base of the cascode transistor $Q_3$ and the cathode of the PIN diode 12. (The diodes are now numbered as transistors in recognition that they are implemented as diode-connected transistors in OEICs.) Diodes $Q_8$, $Q_9$, $Q_{10}$ are connected in series both with local ground and with the load resistor $R_5$, also connected to the positive power supply line 14. The connecting point of the load resistor and the diode string biases the base of the cascode transistor $Q_3$ with 2.1V. Similarly, diodes $Q_{11}$, $Q_{12}$, $Q_{13}$ and a load resistor $R_6$ bias the cathode of the PIN diode 12 with 2.1V. The replication of diode strings dedicated to two different tasks eliminates the bypass path mentioned in regards to the amplifier of FIG. 3 and thus eliminates the limitation on feedback bandwidth produced through the collector-base capacitance of the cascode transistor $Q_3$. Further, the replicated diode strings and associated load resistors may be tailored for their specific needs. The cascode transistor $Q_3$ should have a very low impedance reference at its base, while the impedance of the reference for the PIN diode 12 may need to be a higher value that is deliberately controlled to help define the feedback stability. With separate strings, the current through the PIN string $Q_{11}$, $Q_{12}$, $Q_{13}$ can be adjusted for the desired stability. Such control is equivalent to a variable resistor between the PIN diode 12 and the input of the amplifier. In the design of FIG. 4, the load resistance R6 is set to 5000 Ω, thereby setting the current through the PIN diode string at about 0.6 mA, resulting in a string impedance of about 130 Ω, following the calculation of Equation (1). On the other hand, the DC biasing current through the cascode string $Q_8$, $Q_9$, $Q_{10}$ is about 2.1 mA.

At the output of the second emitter follower $Q_4$, a resistance $R_8$ has been added to provide a 0.3V drop to thereby slightly increase the collector voltage on the cascode transistor $Q_3$, thus increasing the headroom.

The output to the second-stage differential amplifier 22 has been isolated and level-shifted by an emitter-follower transistor $Q_6$ having its emitter coupled to the negative power supply line 40 through a resistor $R_9$. The collector of the emitter-follower transistor $Q_6$ is bootstrapped with signal to minimize the loading effect that its collector-base capacitance exerts on the transimpedance amplifier feeding it. The output passes through a serially connected $R_{13}$ resistor for characteristic transmission termination. Another emitter-follower transistor $Q_5$ provides the bootstrapping action with its base connected to the output path from the second emitter-follower transistor Q4.

Diodes $Q_{15}$, $Q_{16}$ serially connected between the positive power supply line 14 and the serially arranged collectors of the emitter-follower transistors $Q_4$, $Q_5$ reduce unnecessary collector voltages to reduce their dissipation and increase reliability.

A clamp transistor $Q_7$ has been added to the feedback loop in parallel to the feedback resistance $R_f$ to prevent overly negative amplifier outputs. As light input to the PIN diodes 12 increases, the output of the transimpedance stage will go negative. To prevent very intense input light from driving the output too negative, the clamp transistor $Q_7$ parallel to the feedback resistor $R_f$ begins to conduct current when the output of the transimpedance amplifier goes 1.4V negative with respect to the quiescent value. The biasing is conveniently accomplished by grounding the base of the clamp transistor $Q_7$, making it look like a quiet cascode. A similar effect can be accomplished with a diode. Resistor $R_{10}$ placed in series with the clamp transistor $Q_7$ sets the transimpedance gain in this compression region to about 300 Ω, preserving stability.

The feedback capacitance $C_f$ is connected to the output of the first emitter follower transistor $Q_2$ rather than to that of the second emitter follower transistor $Q_4$, as was done in FIG. 3. The output load resistor $R_4$ thus separates parallel feedback paths including the feedback capacitor $C_f$ and the feedback resistor $R_f$. This connection aids stability and effectiveness of the feedback capacitor $C_f$ in providing stability by avoiding added phase offset due to the signal passing through the second emitter follower $Q_4$ on its way to the feedback capacitor $C_f$ during high-frequency operation. A resistor $R_7$ is put in series with the feedback capacitor $C_f$ to maintain stability at very high frequencies by establishing a minimum value for the closed-loop gain.

The design of FIG. 4 produces a transimpedance amplifier having a gain of about 1500 Ω. It requires 8.5 mA of power at +5VDC and 4.0 mA at −5.2VDC for a total power of 63 mW. The power values are multiplied by the number of WDM channels, but they are within an acceptable range for an integrated receiver.

The remaining stages shown in FIG. 1 will not be explained in detail, but only their general requirements and preferred approaches will be described.

The differential stage 22 has two important tasks. First, it performs a conversion from a single-ended signal coming from the transimpedance amplifier to a double-ended one for driving the output stage. The use of a differential signal is important in improving the system immunity to noise in the power supply and cross talk from other channels. The second function of the differential stage 22 is to provide gain. With a differential-stage gain of 5, the transimpedance gain is increased from 1500 Ω to 7500 Ω. It is also preferred that the differential stage controls the onset of clipping under large signal conditions. This can be accomplished by the differential stage beginning to gain-compress at about the same signal level point as the output stage.

A preferred design for the differential stage is a degenerated differential amplifier preceded and followed by emitter followers with level shifting diodes in a fully balanced and symmetrical design.

The output stage 24 amounts to a hefty degenerated differential pair driving 50 Ω load resistors.

The matching circuit 28 depends on the packaging, board arrangement, and eventual use of the receiver array. The preferred design includes a low-pass π-type RF matching network utilizing the inevitable bond wire and package lead inductances as the series inductors.

Figure 5:
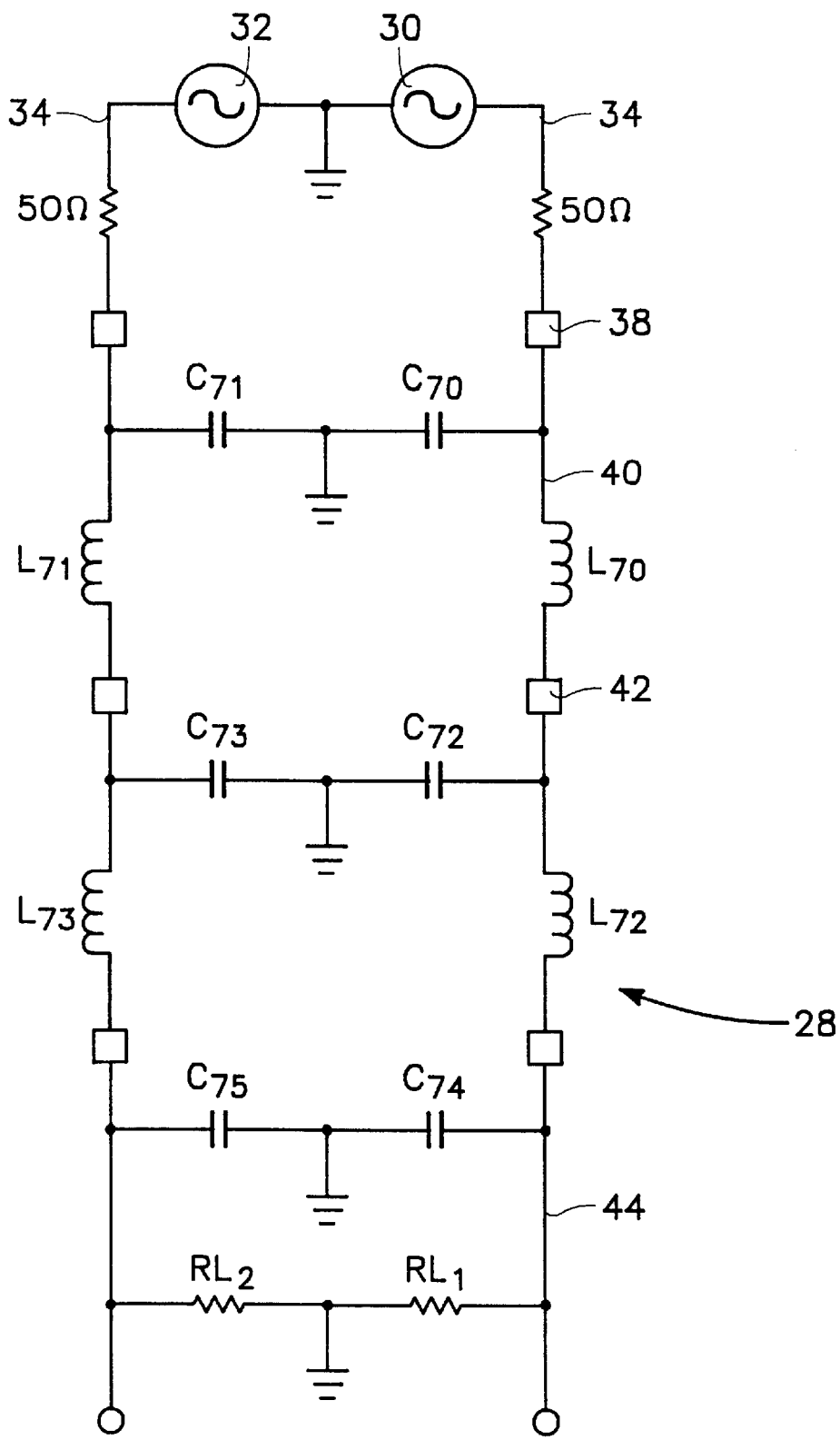
FIG. 5 is a schematic diagram of an output matching circuit.

As illustrated in FIG. 5, for purposes of the matching circuit 28, the output stage 24 can be modeled as two grounded signal sources 30, 32 transmitting on transmission lines 34 which look like 50 Ω resistors. The transmission lines 34 terminate on chip bonding pads 38 which have parasitic capacitances $C_{70}$, $C_{71}$, typically of the order of 100 fF. Bonding wires 40 connect the chip pads 38 to package pins 42. The bonding wires 40 each have an inherent inductance $L_{70}$, $L_{71}$, and the pins 42 have an inherent inductance $L_{72}$, $L_{73}$. All these inductances are typically 1 nH. The package pins 42 are connected to a pair of 50 Ω transmission lines that are terminated by 50 Ω characteristic impedances $RL_1$, $RL_2$, and they have stray board capacitances $C_{74}$, $C_{75}$ of about 2000 fF each. The stray capacitances are the most important elements.

The circuit is tuned as a fifth-order LC low-pass filter by the addition of tuning capacitances $C_{72}$, $C_{73}$ connected from the pins 42 to ground. With the values given for the other elements, each of the tuning capacitances $C_{72}$, $C_{73}$ may be 500 fF.

The stray line inductances in the bond wires 40 can be reduced by placing them in close physical proximity, which implies that they should not be separated by a ground wire or plane. This structure can be easily accomplished with multi-wire ribbon cable wherein the multiple wires run in parallel in a ribbon plane and are separated by predetermined lateral spacings. Possibly, a separate ground wire could be dedicated to each bond wire 40 on the opposing sides of the paired bond wires 40. An even better arrangement is to use four bond wires interspersed with the two signals and having two ground wires on the outsides.

The design of all stages is subject to overall considerations. All transistors should be matched to each other as much as is possible. They should be oriented in the same direction in the OEIC layout. Transistors that are differential pairs generally should be laid out next to each other with no vertical offset. In some cases, multiple emitter follower transistors may share the same collector mesa since their collectors are all connected to the same node.

All resistors should be matched in a relative sense, even though they are not all of the same value. Thus, if the fabrication process changes in some way, such as higher collector resistivity or larger over-etch, the resistances stay in proportion. To accommodate this wide process window for resistors, they should all be oriented in the same direction, preferably with the same width in the OEIC. A 10 μm width seems preferable. Resistors of lower resistance values should be assembled from parallel combinations of higher-value resistors.

As shown by TABLE 3, there is only one important intentional capacitor, the feedback $C_f$. This should be a capacitor disposed between the first and second metal levels, with the bottom metal level connect to the input node of the input amplifier.

In the critical nodes, specifically the base of the input transistor $Q_1$ and the collector of the cascode transistor $Q_3$, unnecessary parasitic capacitances should be avoided. That is, be aware of what is next to what, particularly paths linking large-signal nodes back to the amplifier input node.

The ground metal should be of generous proportion and tend to fill unused areas, as long as its proximity to high-impedance signal lines does not introduce too much parasitic capacitance to ground. The analog ground lines should be generous, and any shielding of it is particularly beneficial. The negative power supply lines should be generously proportioned and run on top of or below the ground line to accumulate on-chip bypass capacitance.

It may be a good idea of allow for late-process trimming of the resistive components by providing multiple selectively enabled values of various resistances. The different resistances can be then selected by a change in the metal-2 or higher mask.

The above design is primarily directed toward a 2 Gb/s receiver. The bandwidth can be increased, for example to facilitate 10 Gb/s operation, but the fundamental design remains valid. Most of the modifications are restricted to the input transimpedance amplifier.

For higher bandwidth to accommodate 10 Gb/s operation, to first order, the transimpedance stage should be run hotter and with less transimpedance. The feedback resistance $R_f$ should be decreased to about 500 Ω, and perhaps the feedback capacitance $C_f$ should be decreased to about 15 fF. Next, the impedance of the PIN diode string $Q_{11}$, $Q_{12}$, $Q_{13}$ should be reduced by decreasing the PIN biasing resistor $R_6$ to 1500 Ω or less. The cascode base reference is stiffened by reducing the cascode biasing resistor $R_5$ to 1000 Ω or less.

Next, the current in the input transistor $Q_1$ needs to be increased by a factor of perhaps three. Preferably, the power supply to the positive power supply line 14 is increased, to perhaps 7VDC. It is a matter of power conservation versus minimized number of power supplies whether the other positive-supply loads in the receiver design are run at this voltage or the lower voltage. With the higher positive supply voltage, one more diode drop can be added to the emitter-follower string, giving the principal cascode transistor $Q_3$ more reverse bias on its collector-base junction to reduce the associated capacitance.

The bias current to the output transistor $Q_2$ should be doubled as is the bias current to the transistor $Q_6$.

The above described design provides an optical receiver of high performance with fairly simple electronics. In particular, it avoids excessive cross-talk between multiple WDM channels. Nonetheless, the design is also applicable to single-wavelength receivers.

What is claimed is:

1. An optical receiver, comprising:
    a photodetector including a p-n junction;
    a bipolar input transistor receiving on its base a signal from said photodetector;
    a bipolar first output transistor having its base connected to a collector of said input transistor;
    a feedback path between an emitter of said first output transistor and said base of said input transistor and including a feedback resistance;
    a first power supply line biasing said output transistor;
    a second power supply line; and
    at least one first diode interposed between said second power supply line and a side of said photodetector opposite said base of said input transistor;
    wherein an output of said receiver is taken from a point in said feedback path.

2. The receiver of claim 1, wherein an emitter of said input transistor is connected to said second power supply line.

3. The receiver of claim 2, further comprising a load resistor connected between said first power supply line and said collector of said input transistor.

4. The receiver of claim 1, further comprising a cascode transistor having its principal current terminals serially arranged between said first power supply line and said collector of said input transistor.

5. The receiver of claim 4, wherein said at least one first diode is interposed between a base of said cascode transistor and said second power supply line.

6. The receiver of claim 4, further comprising at least one second diode interposed between a base of said cascode transistor and said second power supply line.

7. The receiver of claim 4, further comprising a load resistor connected between a collector of said cascode transistor and said first power supply line.

8. The receiver of claim 1, further comprising:
    an emitter follower transistor having a base connected to an emitter of said output transistor and having an emitter driving said output and driving said feedback resistance; and
    a feedback capacitance having a first side connected to a point between said emitter of said output transistor and said base of said emitter follower transistor and a second side connected to said base of said input transistor.

9. The receiver of claim 1, further comprising a bipolar transistor having a collector and an emitter connected to two sides of said feedback resistance and a base connected to a predetermined potential.

10. An optical receiver, comprising:
    a photodetector including a p-n junction;
    a bipolar input transistor receiving on its base a signal from said photodetector;
    a bipolar first output transistor having its base connected to a collector of said input transistor;
    a capacitor disposed in a first feedback path between an emitter of said output transistor and said base of said input transistor;
    an emitter follower transistor having its base connected to said emitter of said output transistor and its emitter driving an output of said receiver;
    a feedback resistor disposed in a second feedback path between said emitter of said emitter follower transistor and said base of said input transistor.

11. The receiver of claim 10, further comprising a limiting resistor disposed in said first feedback path.

12. The receiver of claim 10, further comprising a bipolar semiconductor device having its two principal current terminals connected to the two sides of said feedback resistor.

13. An optical receiver, comprising:
    a photodetector including a p-n junction;
    a bipolar input transistor receiving on its base a signal from said photodetector;
    a bipolar first output transistor having its base connected to a collector of said input transistor;
    a feedback path between an emitter of said first output transistor and said base of said input transistor and including a feedback resistance;
    an output of said receiver being taken from a point in said feedback loop;
    a first power supply line biasing said output transistor;
    a second power supply line connected to an emitter of said input transistor;
    a third power supply line, wherein a voltage on said second power supply line is intermediate voltages on said first and third power supply lines; and
    a current source connected between said point in said feedback loop and said third power supply line.

14. The receiver of claim 13, wherein said current source comprises a resistor.

15. The receiver of claim 13, further comprising at least one first diode interposed between said photodetector and said second power supply line.

16. The receiver of claim 13, further comprising:
    a cascode transistor having its emitter and collector connected between said first power supply line and said collector of said input transistor; and
    at least one second diode connected between a base of said cascode transistor, at least one second diode other than said first diode interposed between said photodetector and said second power supply line.

17. An optical receiver, comprising:
    a photodetector including a p-n junction;
    a bipolar input transistor receiving on its base a signal from said photodetector;

a first emitter follower having its control terminal connected to a collector of said input transistor;

a second emitter follower accepting an emitter output of said first emitter follower; wherein an output of said receiver is taken from an emitter of said second emitter follower;

a first feedback path including a feedback capacitance connected between said emitter output of said first emitter follower and said base of said input transistor; and a second feedback path including a feedback resistance connected between an emitter output of said second emitter follower and said base of said input transistor.

18. The receiver of claim 17, further comprising a third emitter follower connected receiving an emitter output of said second emitter follower and providing an output signal.

19. The receiver of claim 17, further comprising a transistor having its principal current terminals connected across said feedback resistance and its control terminal held to a predetermined potential.

20. An optical receiver comprising:

a photodiode for receiving light;

a transimpedance amplifier for outputting a first signal, said transimpedance amplifier outputting a first signal and connected to said photodiode and having a bipolar input transistor having an emitter connected to a predetermined potential;

a differential input and output amplifier receiving said first signal on a first input, having second input connected to said predetermined potential, and outputting two differential signals;

a transmission line output from said receiver; and a matching circuit connected to outputs of said differential amplifier carrying said differential signals and said transmission line and comprising:

a first source of parasitic inductance associated with a packaging of said receiver and connected between a pin of said packaging and an integrated circuit located within said packaging and including said transimpedance amplifier and said differential amplifier;

a second source of parasitic inductance associated with said packaging and connected between a second pin of said packaging and said integrated circuit;

a first node connected between said first pin and a first conductor of said transmission line;

a second node connected between said second pin and a second conductor of said transmission line; and two capacitors connected respectively from said first and second nodes to a point of predetermined potential, thereby forming a low-pass filter matching network in combination with said parasitic inductances and parasitic capacitances of said packaging.

21. The receiver of claim 20, wherein said first and second sources of parasitic inductance comprises bond wires between said integrated circuit and said first and second pins.

22. The receiver of claim 21, wherein said bond wires are arranged in a ribbon cable.

23. An optical receiver, comprising:

a photodiode receiving light;

a transimpedance amplifier connected to said photodiode and outputting a first signal;

a differential input and output amplifier receiving said first signal and a second signal connected to a bus upon which is impressed a predetermined voltage and output third and fourth signals amplified from said first and second signals;

a transmission line output from said receiver; and a matching circuit incorporated on a wiring board and connected between outputs of said differential amplifier and said transmission line comprising a first bond wire connected between an integrated circuit including said transimpedance amplifier and said differential amplifier and a first pin of a package of said integrated circuit, a second bond wire connected between said integrated circuit and a second pin of said package, a first line on said board connected on one end to said first pin and on a second end to a first conductor of said transmission line;

a second line on said board connected on a first end thereof to said second pin and on a second end thereof to a second conductor of said transmission line, and two capacitors connected respectively from said first ends of said first and second lines to a point of predetermined potential, thereby forming a low-pass filter in combination with parasitic capacitances and inductances of said bond wires, pins, and lines.

* * * * *